United States Patent
Holister et al.

(10) Patent No.: US 6,504,549 B1
(45) Date of Patent: Jan. 7, 2003

(54) APPARATUS TO ARBITRATE AMONG CLIENTS REQUESTING MEMORY ACCESS IN A VIDEO SYSTEM AND METHOD THEREOF

(75) Inventors: Brad Holister, Newtown, MA (US); Andrew E. Gruber, Arlington, MA (US); Carl K. Mizuyabu, Thornhill (CA)

(73) Assignee: ATI International Srl (BB)

( * ) Notice: Subject to any disclaimer, the term of this patent is extended or adjusted under 35 U.S.C. 154(b) by 0 days.

(21) Appl. No.: 09/314,208

(22) Filed: May 19, 1999

(51) Int. Cl.$^7$ .............................................. G06F 13/18
(52) U.S. Cl. ...................... 345/535; 345/545; 345/520
(58) Field of Search .................... 345/501, 503, 345/520, 531, 533, 535, 545, 547

(56) References Cited

U.S. PATENT DOCUMENTS

| | | | |
|---|---|---|---|
| 5,602,986 A | | 2/1997 | Trevett |
| 5,822,772 A | * | 10/1998 | Chan et al. .................... 710/52 |
| 5,987,574 A | | 11/1999 | Paluch |
| 5,996,036 A | * | 11/1999 | Kelly ......................... 709/208 |
| 6,002,412 A | | 12/1999 | Schinnerer |
| 6,076,139 A | * | 6/2000 | Welker et al. .............. 711/104 |
| 6,078,338 A | * | 6/2000 | Horan et al. ................ 345/503 |
| 6,092,158 A | * | 7/2000 | Harriman et al. ........... 710/240 |
| 6,199,145 B1 | * | 3/2001 | Ajanovic et al. ........... 711/105 |
| 6,327,636 B1 | * | 12/2001 | Guthrie et al. .............. 710/119 |
| 6,330,646 B1 | * | 12/2001 | Clohset et al. .............. 711/151 |
| 6,381,672 B1 | * | 4/2002 | Strongin et al. ......... 365/238.5 |
| 6,412,048 B1 | * | 6/2002 | Chauvel et al. ............. 365/222 |

FOREIGN PATENT DOCUMENTS

EP 0829820 A2 3/1998

OTHER PUBLICATIONS

European Search Report for Patent Application EP 0030 4528, published May 3, 2002.

* cited by examiner

*Primary Examiner*—Ulka J. Chauhan
(74) *Attorney, Agent, or Firm*—Vedder, Price, Kaufman, & Kammholz

(57) ABSTRACT

A method and apparatus dealing with optimizing the arbitration between clients requesting data. In particular, a set of rules determining which client request will provide an optimized subsequent memory access is implemented. The highest rule recognizes a client in urgent need of data, generally because it has not been services by the arbiter. The next highest-ranking rules would recognize data accesses of the same operation, such as read or write, and to the same page of memory, or requests to a different bank of memory. The next highest ranking rules would be for data accesses on the same page currently being accessed, but for a different operation, and for a different operation and to a different bank. Finally, any other client requests to a different page on the same bank/ would have the lowest priority. Such a request optimizes bandwidth of the memory bus.

19 Claims, 10 Drawing Sheets

APPARATUS TO ARBITRATE AMONG CLIENTS REQUESTING MEMORY ACCESS IN A VIDEO SYSTEM AND METHOD THEREOF

RELATED APPLICATIONS

A copending application has been previously filed. The application Ser. No. 09/314,209 is entitled "Apparatus to Control MemoryAccesses in a Video Systeam and Method Thereof" has been filed concurrently with the present Application, has at least one common inventor with the present application, and is assigned to the same assignee as the present application.

A copending application has been previously filed. The co-pending application Ser. No. 09/314,561 is entitled "apparatus for accessing memory in a video system and method thereof" has been filed concurrently with the present Application, has at least one common inventor with the present application, and is assigned to the same assignee as the present application.

FIELD OF THE INVENTION

The present invention relates generally to a method and apparatus for arbitrating accesses to memory, and more specifically relates to a method and apparatus for arbitrating accesses to memory in a video system.

BACKGROUND OF THE INVENTION

Many computer and database applications involve data having a multidimensional nature. For example, data in a spreadsheet is referenced with regard to a particular row and column in which the data appears. The same is true for data associated with video image data. Video image data, or video data, can be referenced relative to a particular x-y coordinate location for two dimensional (2-D) video data, and with regards to particular x-y-z coordinates for three dimensional (3-D) video data.

Conventional memory devices are accessed using an uni-dimensional addressing scheme. That is each data element is one of an adjacent plurality of physical word locations within the memory, and is referenced by a unique, single dimensional, address location. Storing multi-dimensional data in an uni-dimensional memory requires a mapping from each multi-dimensional object coordinate to a corresponding uni-dimensional memory address. The un-dimensional addressing of the memory space is adequate for many applications. However, where 2-D and 3-D graphic applications are used, the number of video clients requesting data, and the format in which the data is stored require highly optimized accesses to the memory space.

Traditionally, optimization of accessing memory space has occurred through the use of burst accesses to multiple memory locations. During burst accesses, a single memory access request is capable of retrieving or storing multiple words of data with a single access request. However, such a technique is inefficient with data accesses for video memory, in that video data is generally not optimized to have data stored in sequential address spaces in physical memory. Without the data being stored sequentially, it takes longer to acquire data for a requesting client. As a result, there is a greater probability that other clients will be deprived of the memory bandwidth needed in order to service its own needs.

Therefore, it would be desirable to optimize data accesses to a video memory system.

BRIEF DESCRIPTION OF THE DRAWINGS

FIG. 3 represents a data block having data words stored in a specific order in accordance with the present invention;

It should be understood that the figures are for illustrative purposes, and represent specific embodiments of the present invention. As such, it should be further understood that the figures are not drawn to scale, nor indicative of any final layout or other such relationship among the devices illustrated.

DETAILED DESCRIPTION OF THE DRAWINGS

A method and apparatus is disclosed for storing sequential data words associated with a block of data in a non-linear manner within the data block, such that any row or column associated with the data block may be accessed using a burst access. A row or column of data is accessed by a burst, thereby freeing up instruction bandwidth of a video controller. In particular, it is assured that each row and column of data associated with the data block has at least one sequential pair of data words associated with it. By assuring at least one physically sequential pair of data words, it is possible to issue a burst request for a minimum of two words of data with each row access, or column access of the video controller.

Another aspect of the present invention allows for dynamic issuing of memory access instructions. In particular, a specific data access request about to be sent to a memory, such as a frame buffer, is dynamically chosen based upon pending requests within a pipeline. It is possible to optimize video data requests by dynamically selecting a memory access instruction at the time the request is issued. In particular, if it is recognized that a memory about to be accessed, and that memory bank by an instruction will no longer be needed by subsequent memory requests, the instruction can be changed from a normal access to an access with additional features, such as an auto-close or auto-precharge option. For example, by using an auto close option, the memory bank being accessed is closed after the access, without issuing a separate memory close instruction.

Yet another aspect of the present invention deals with optimizing the arbitration between clients simultaneously requesting data. In particular, a set of rules determining which client request for subsequent memory access is implemented to rank client requests. The rule having a highest rank recognizes a client in urgent need of data. The next highest-ranking rules will recognize data accesses of the same operation, such as read or write, and to the same page of memory, or requests to a different bank of memory. The next highest ranking rules would be for data accesses on the same page currently being accessed, but for a different operation, and for a different operation to a different bank. Finally, any other client requests to a different page on the same bank would have the lowest priority. Such a request optimizes bandwidth of the memory bus.

Figure 1:
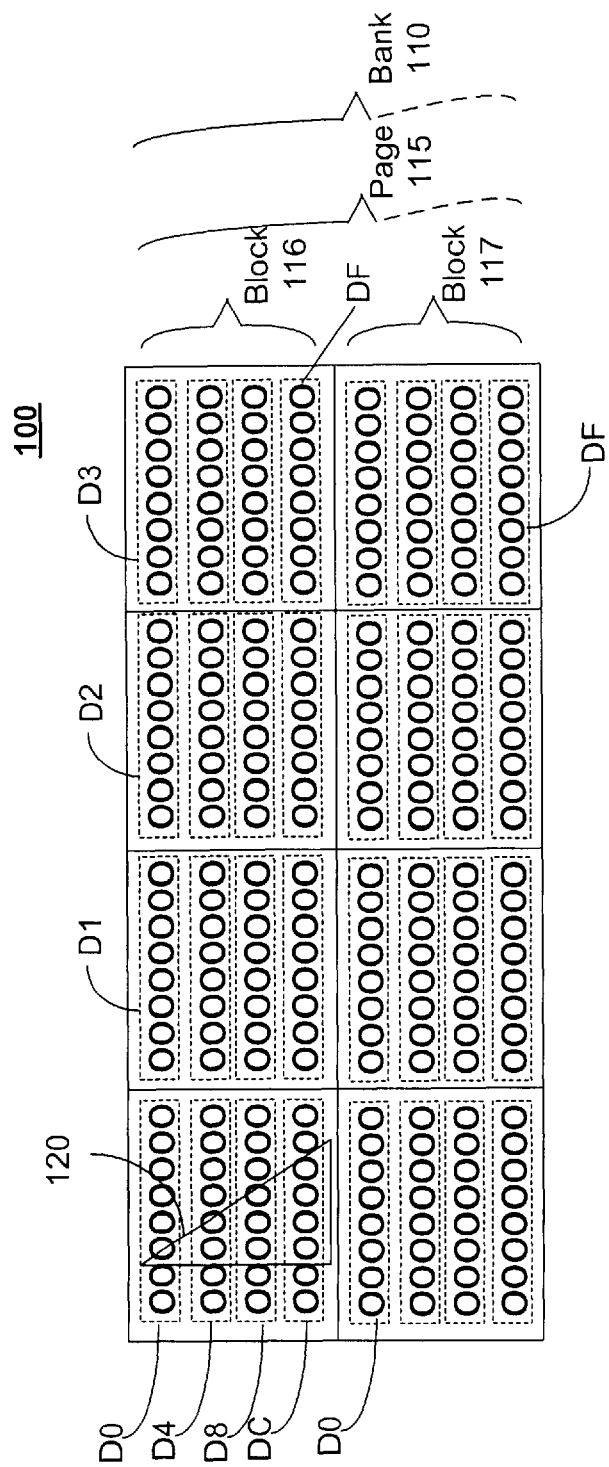
FIG. 1 represents a portion of a video monitor stored in two blocks of data in accordance with the present invention.

FIG. 1 is representative of a grid portion 100 of a video monitor as can be stored in memory. In particular, a 32-by-8 grid of pixels is represented. Each pixel is capable of representing a variety of colors and shades of colors. By driving pixels to predetermined color levels, it is possible for images to be displayed upon a monitor. For example, the triangle 120 illustrated within the pixel grid portion 100, can be displayed by turning on, or off, those pixels at least partially intersecting the shape 120. The actual color and shade of each pixel is stored as data within memory. For example, each pixel illustrated as part of the grid 100 can be represented in memory by two 8-bit bytes of data. Therefore, data word D0, which represents eight pixels associated with the grid 100, would require sixteen 8-bit bytes of data to represent the eight pixels indicated. Data words are represented by the labels D0 through DF, which represent the data words associated with the pixels of a given block for grid 100.

In order to display the top row of data pixels it is necessary to access the monitor by sending the data words D0 through D3. In one embodiment, the data words D0–D3 are accessed sequentially. "Sequentially" accessing data words refers to accessing logically adjacent words, e.g. D0 through D3, one after another with no other data being accessed; or when a column is being accessed, the logically adjacent data words would be D0, D4, D8 and DC. Data and video controllers are often optimized to access rows of data. Often these row accesses correspond to the issuing of a burst request, whereby multiple words are accessed by a single access request. However, with video memory, row accesses to video memory can result in inefficient memory accesses.

Referring to FIG. 1, the first row of data, is likely to have only a single pixel associated with the shape 120. Therefore, accessing the entire first row of data would not be efficient for rendering the shape 120. Therefore, a method and apparatus for accessing vertical columns of data, D0, D4, D8, and DC, would be advantageous. However, because traditionally the data words D0, D4, D8 and DC are stored in physical memory in non-sequential locations, it is not possible to optimize such accesses without costly memory structures or implementations.

In one embodiment of the present invention, the actual physical storage locations of the sequential data words are modified within the address space of the data block to assure that at least one sequential data access is performed with each row access or column access. FIG. 3 illustrates one such non-linear mapping technique within a data block. The data block of FIG. 3 illustrates four rows beginning with physical addresses A0, A4, A8, and AC. In addition, the data block of FIG. 3 illustrates four columns beginning with the physical addresses A0, A1, A2, and A3. The four address locations A0–A3 contain the logical data words, D0, D1, D2, and D6. The four address locations A4–A7 of row A4 contain the logical data words, D4, D5, D3, and D7. The four physical address locations A8–AB of row A8 contain the logical data words, D8, DC, DA, and DB. The four physical address locations AC–AF of row AC contain the logical data words, D9, DD, DE, and DF. By storing data in this manner, an efficient method of accessing either rows or columns of data is obtained. This is best understood with reference to FIG. 2.

Figure 2:
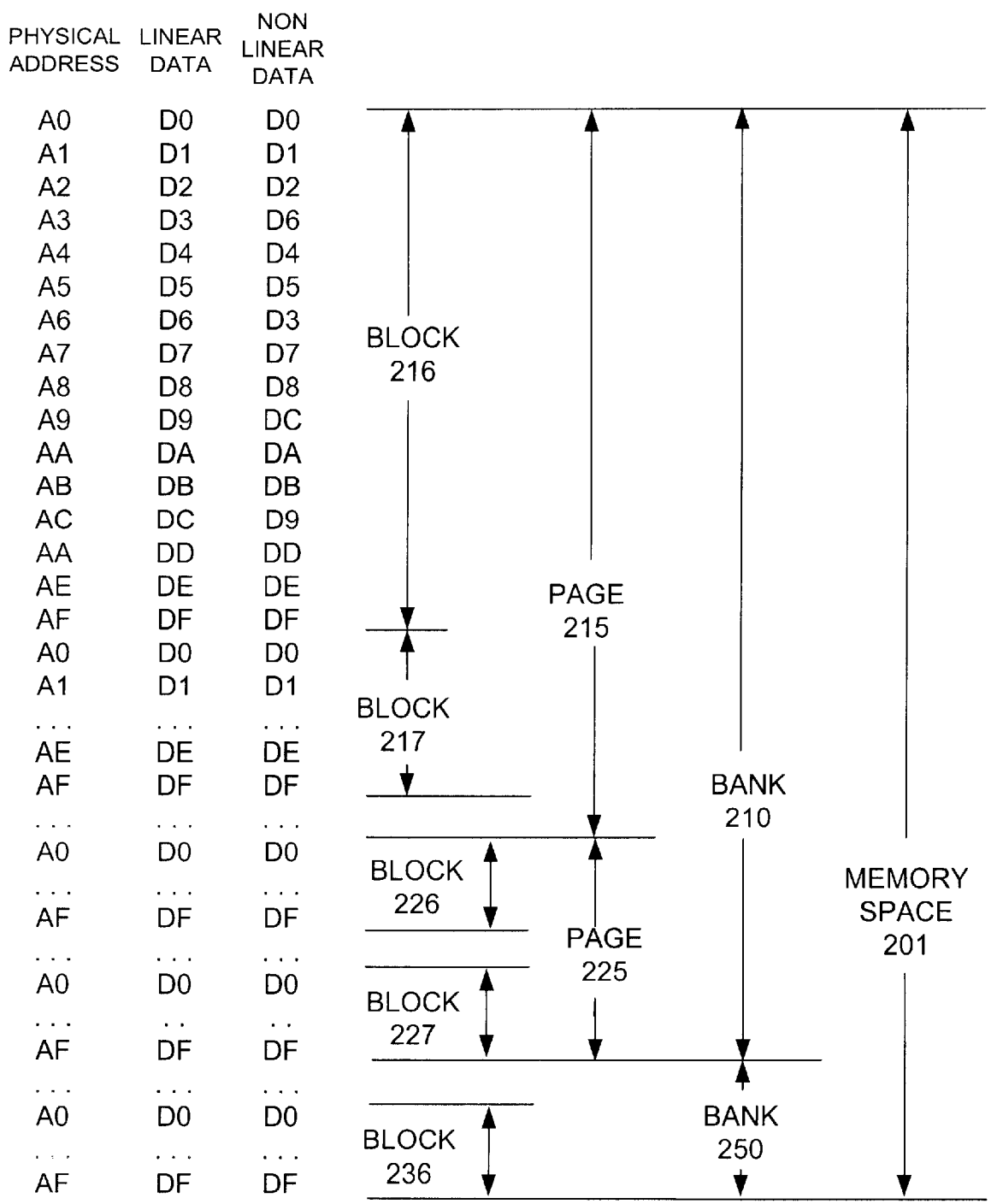
FIG. 2 represents, in tabular form, a non-linear mapping of data to physical addresses in accordance with the present invention.

FIG. 2 illustrates the block of data 116 of FIG. 1 when stored in accordance with FIG. 3. The block of data has physical addresses A0 through AF. The logical data values, D0–DF, when stored linearly, or sequentially, are stored as Linear Data, as indicated by the second column of FIG. 2. The logical data values, D0–DF, when stored according to the scheme of FIG. 3, are stored as non-linear data as indicated by the third column of FIG. 2. In accordance with a specific embodiment of the present invention, however, the non-linear storage is such that the first four logical words mapped to physical address are D0, D1, D2, and D6. The next four logical words mapped to the physical address are D4, D5, D3, and D7. The next four logical words mapped to the physical address are D8, DC, DA, and DB. The final four logical words mapped to the physical address of the block of data 116 are D9, DD, DE, and DF.

These data locations are mapped onto the data block in FIG. 3 for reference purposes. Referring to the data block of FIG. 3, it can be seen to access the first row of data words, D0 through D3 of FIG. 1 will require accesses to memory locations A0, A1, A2, and A6. These accesses will provide the logically sequential data words of row 1. It is important to note that data words D0 and D1 are also physically sequential in that they occupy adjacent physical address locations. Specifically, D0 and D1 occupy sequential addresses A0 and A1. Therefore, it is possible to issue a single burst access instruction requesting that these two words be issued. Likewise, a data access of the vertical column of data including D0, D4, D8 and DC can be accessed by reading physical address locations A0, A4, A8 and A9. When accessing this column, column A0, the data words D8 and DC are stored in physically sequential address locations A8 and A9. Therefore, it is possible to also issue a burst access instruction when reading column A0. Likewise, each column and row of data associated with the pixels of the monitor portion 100 of FIG. 1 are capable of being efficiently accessed because each row and column is assured of being able to issue at least one burst access request.

Figures 4, 5:
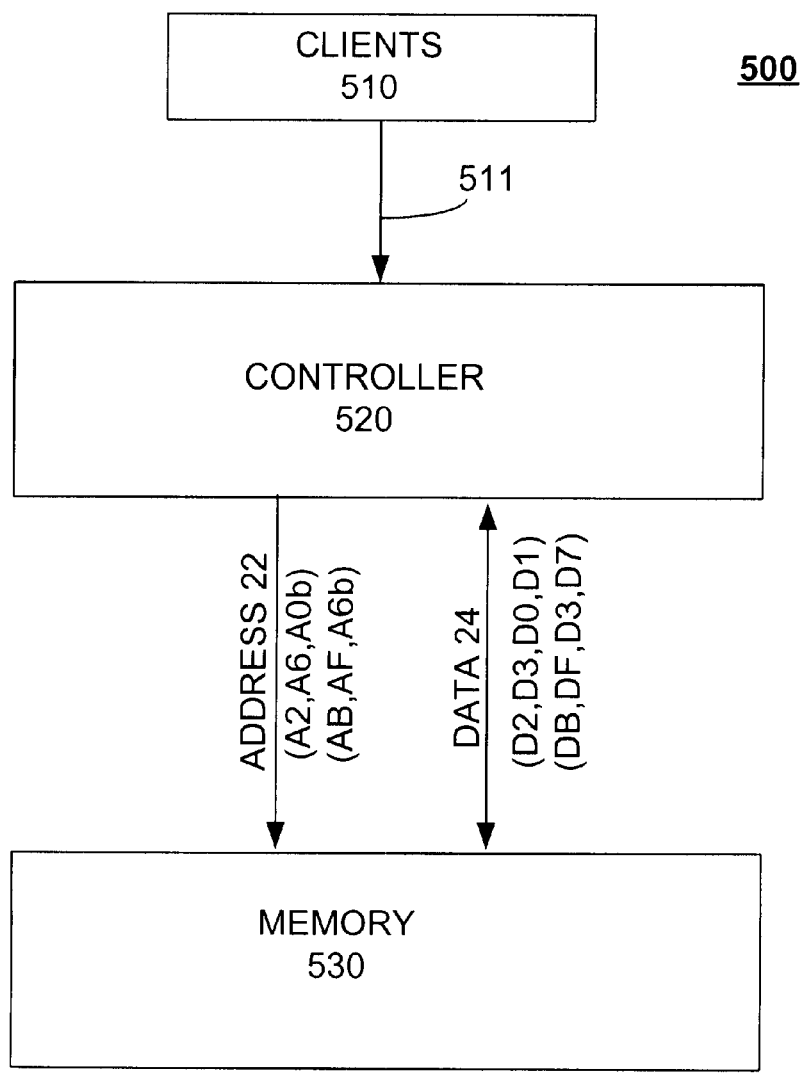
FIG. 4 illustrates, in block form, a data cache that is capable of storing either horizontal cache lines of data or vertical cache lines of data.
FIG. 5 illustrates, in block diagram form, a system portion for accessing data in accordance with the present invention.

The advantage of using burst requests is further illustrated by FIGS. 4 and 5. FIG. 4 illustrates a specific implementation of a cache line, such as a pixel cache line in accordance with a specific embodiment of the present invention. The tags associated with the cache 400 can be either used as horizontal tags, or vertical tags. When used as horizontal tags, requests to fill the cache line would access the logically sequential horizontal data words necessary to fill the cache line. For example, the cache line associated with tag0 would request a sequential data D0 through D3. While the cache line associated with tag2, for example, would request the sequential data words D8 through DB. Likewise, when the tags of cache 400 are vertical tags, and access to a column such as the column beginning with data word D0, the request to fill the cache line will access the logically sequential data words D0, D4, D8 and DC. Likewise an access to the column associated with tag 2 would access the logically sequential data words D2, D6, D8 and DE. When accessing data to fill a cache line row, or a cache line column, it is advantageous to be able to save instruction bandwidth by implementing burst requests to access memory. This is illustrated in FIG. 5.

FIG. 5 illustrates a memory request 511 from one of a plurality of clients 510. This memory request 511 is being submitted to a memory controller 520, which in turn accesses data from memory 530. The address line 22 is accessing the first row of data associated with the pixel array 100 of FIG. 1. This is illustrated by the physical address values A2, A6, and A0 associated with address line 22. "A0b" indicates that a burst request from address location A0 has been requested. The data return is illustrated on the data bus 24. The data words returned on the data bus 24 are D2 stored at physical address A2; D3, stored at physical address A6; and data words D0 and D1, sequentially stored in physical address space beginning at address A0.

Next, an example using column addresses is illustrated. The column being accessed is the column associated with tag3. This column includes the data words D3, D7, DB, and DF. These specific data words are accessed by first accessing physical location AB, next physical location AF, and finally a burst access request to physical location A6. By providing a burst request for two words at address A6, the data values D3 and D7 are provided, see the Non Linear data column of FIG. 2.

Note that the accesses illustrated in FIG. 5 do not necessarily access the data words in linear sequential order. Linear sequential order refers to accessing the data words in linear, or logical, order, such that data word D0 is accessed before data word D1, which is accessed before data word D2, etc. Instead, the data words are accessed out of logical order, making it possible to control where in the instruction stream the bandwidth saving occurs. This is illustrated in FIG. 6.

Figure 6:
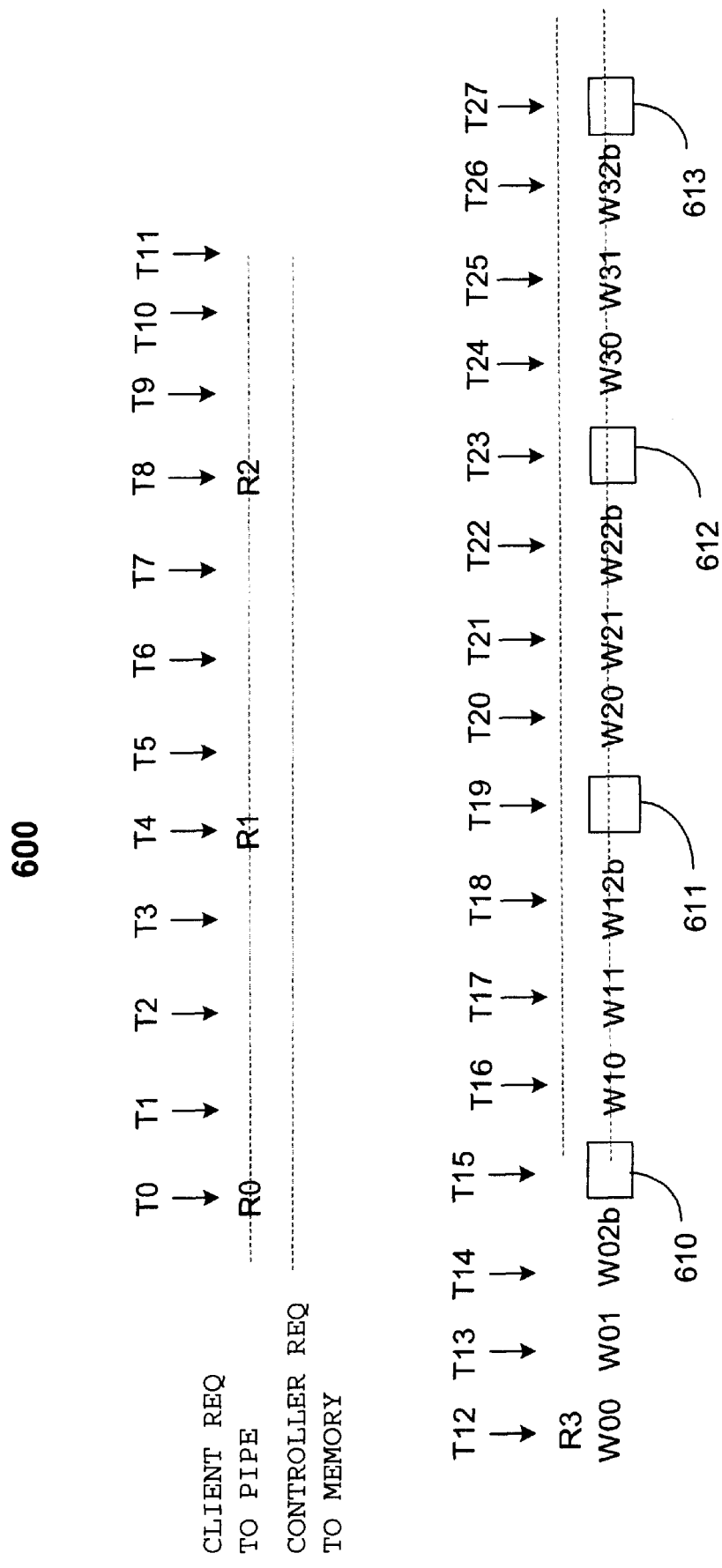
FIG. 6 illustrates specific time slots associated with requesting data in accordance with the present invention.

FIG. 6 illustrates a timing diagram indicating the times where client requests and memory requests occur. A client request is a request from a client, such as one of the plurality of clients 510 of FIG. 5, to the memory controller 520. The client request indicates the word or words to be accessed. The actual memory requests are represented in FIG. 5 in parenthesis associated with Address 22 connecting the memory controller 520 and the actual memory 530. As illustrated in FIG. 6, a first request R0 for a row or column access is made at time T0. Because of a pipeline associated with the memory controller, which will be discussed later, the next client request RI, occurs at time T4. Likewise, subsequent client requests occur at times T8 and T12.

At time T12, a memory request W00 for the first word of data associated with the request R0 is issued. The access request W00 will result in the data associated with the request being placed on a data bus and provided to the client 510. Likewise, at time T13, the data access request W01 is issued, where W01 requests the second word of the R0 client request. At time T14, the data access request W02 is issued, where W02 requests the third and fourth word of the R0 client. It should be noted that request labeled W02B indicates that the access is associated with the third word, access is a burst request. For purposes of illustration, the burst request will access two words of data with a single instruction. As a result, at time T15, instruction bandwidth is saved because it is not necessary to send a memory access request because the burst request issued at time T14 provides two words of data, one at time T14, and the other at time T15. One of ordinary skill in the art will recognize that there may actually be a delay between when the memory request is issued and when the data is returned. However, for purposes of discussion, it will be assumed that the data word is presented during the same time cycle as which the access request is issued.

Next, the data words associated with request R0 of FIG. 6, are requested from time T16 through time T18. In the same manner illustrated above, the request for the third word associated with the request R1 is a burst request whereby two data words will be provided as a result of the single burst request. This results in instruction bandwidth, or memory access bandwidth, being saved at time T19 because a data word access request is not issued at time T19. Likewise, at time T23 and time T27 instruction bandwidth is made available to other requests. This memory bandwidth will be utilized in further aspects of the present invention.

Figure 7:
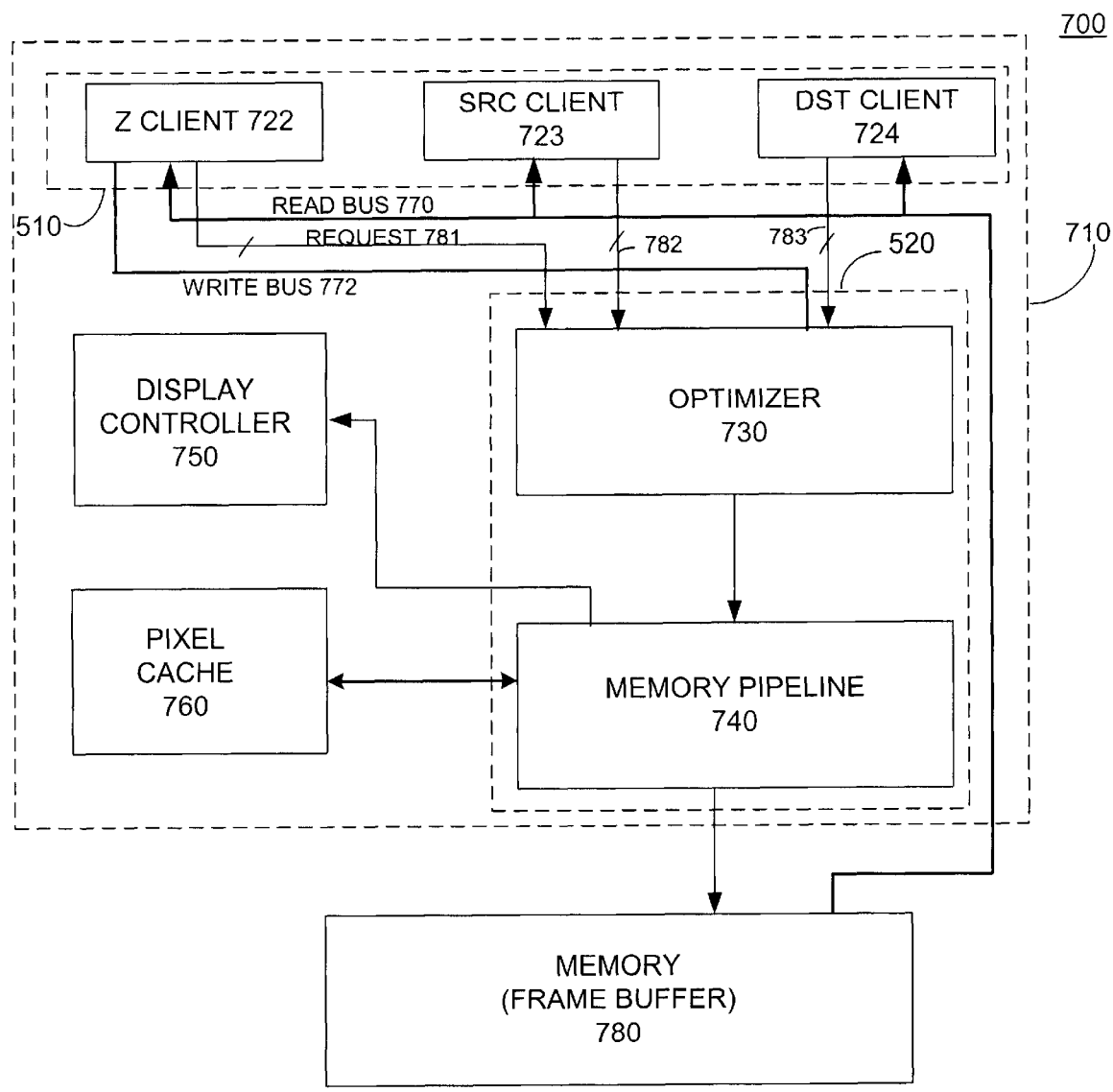
FIG. 7 illustrates a portion of a video controller in accordance with the present invention.

FIG. 7, illustrates a video card 700 in accordance with the present invention. The video card 700 includes a video controller 710 and a memory 780. In a specific embodiment, the video controller 710 is a monolithic video chip. The video controller 710 comprises clients 510, memory controller 520, display controller 750, and pixel cache 760.

The clients 510 further comprise a Z client 722, a source (SRC) client 723, and a destination (DST) client 724. The clients 510 will generally be associated with a video controller of the type of 710. Each of the video clients 722 through 724 receive data from a read bus 720, and provide data to a separate write bus 772. However, one of ordinary skill in the art would recognize that a common read and write bus could be utilized in accordance with the present invention. In addition, each of the video clients 722 through 724 provide client requests 781-783 to the optimizer 730.

The memory controller 720 further comprises an optimizer 730 for arbitrating between the clients 722 through 724, and providing one of the client requests 781–783 to the memory pipeline 740. The memory pipeline 740 is connected to the frame buffer memory 780. The frame buffer memory 780 provides data to the read bus 770, in addition, the frame buffer 780 is also connected to the write bus 722. However, for purposes of illustration, this connection is not illustrated in FIG. 7. The display controller 750 is connected to the memory pipeline 740 and the pixel cache 760 is also connected to the memory pipeline 740.

In accordance with the present invention, the video clients 722 through 724 will provide requests to the optimizer 730 for data accesses. The optimizer 730, selects among the video clients based upon a predetermined optimization criteria to be discussed later. The request that is selected as optimal by the optimizer 730 is provided to the memory pipeline 740. Based upon the memory access instructions stored within the memory pipeline 740, memory access instructions are issued to the frame buffer 780. The actual instructions, or requests, issued to the frame buffer are issued dynamically, in that the actual instruction issued is determined at the time of its issue to the frame buffer in order to optimize memory requests based upon subsequent memory pipeline data. This will be discussed further with reference to FIGS. 10 and 11.

Figure 8:
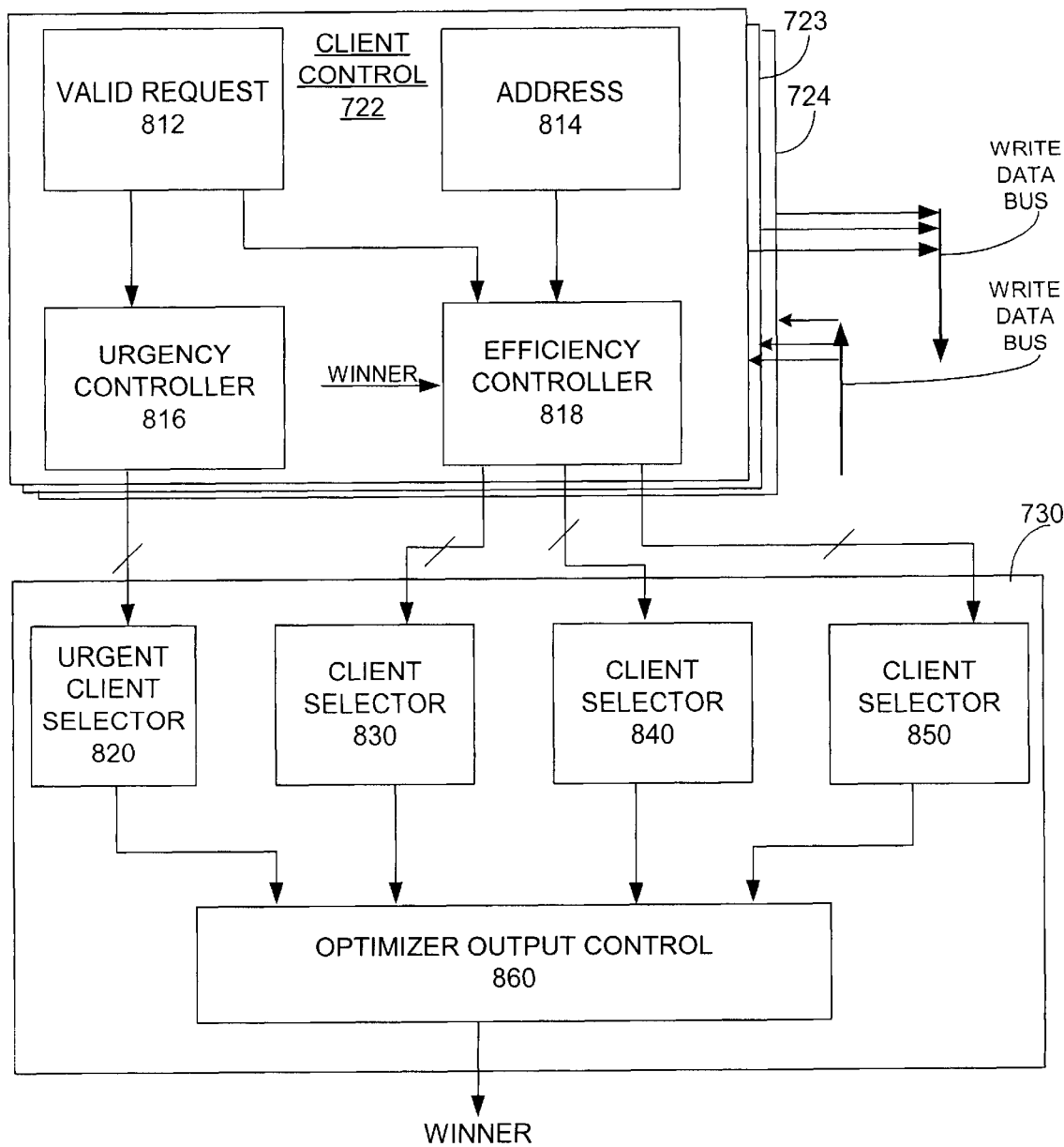
FIG. 8 illustrates a portion of the video controller of FIG. 7 in greater detail.

FIG. 8 illustrates a specific implementation of the optimizer 730. The Optimizer 730 receives inputs from the video clients 722 through 724. In a specific implementation, each of the specific video clients includes a Valid Request Control 812, an Address Portion 814, an Urgency Controller 816, and an Efficiency Controller 818. In operation, when a valid request is received by the Client 722, the Efficiency controller 818, and the Urgency Controller 816 ARE notified of the request.

The Urgency Controller 816 will monitor how much time is passed since the request was received. Generally, the Urgency Controller 816 will include a timer which monitors how long since the last request was received. The Efficiency Controller 818 is connected to the address 814 in order to receive the requested address. Furthermore, the Efficiency Controller 818 receives the address of the last winner (WINNER) as selected by the Optimizer Output Control 860. The last winner is the address of the client selected y the optimizer 730 during the previous arbitration cycle.

The Optimizer 730 comprises an Urgent Client Selector 820, a first Client Selector 830, a second Client Selector 840, and fourth Client Selector 850. The Urgent Client Selector 820 is connected to each client's Urgency Controller 816. The Urgent Client Selector 820 arbitrates among the requests received from the plurality of clients 722-724. The Client Selector 830 monitors a first efficiency criteria, the Client Selector 840 monitors a second efficiency criteria, and the Client Selector 850 monitors a third efficiency criteria. Each of the Client Selectors 830, 840 and 850 select one client request among the received requests meeting its efficiency criteria.

In operation, the Efficiency Controller 818 is connected to each of the Client Selectors 830, 840, and 850. However, Client Controller 722 will generally provide an active request to only one of the Client Selectors 830, 840, and 850 based upon the address being accessed by the client, and the address of the last winner chosen by the optimizer Output Control 860.

The Efficiency Controller 818 will use the criteria of step 920 to determine whether or not a request should be sent to the Client Selector 830. A request is sent to Client Selector 830 when the client is requesting the same operation, such as a read or a write operation to the same page as the previous access; or when a client is requesting the same operation to a different bank of data. Both of these two functions can be implemented without any time penalties based upon the implementation of the present invention. Therefore, if any of the clients are requesting data meeting one of these two criteria, it is most efficient to service these requests next, as no time penalty is incurred.

Next, the Efficiency Controller 818 will determine whether or not to send a request to a Client Selector 840 based upon the criteria of step 930. The criteria of step 930 indicates that a request is generated when the client is requesting a different operation, as compared to the request of previous winner, to the same page; or if the client is requesting a different operation to a different bank. Each of these requests does incur a time penalty. Therefore, it is not as efficient to issue one of these requests over one of the requests using the criteria of step 920, which does not incur a time penalty.

Next, the Efficiency Controller 818 will determine whether or not to send a request to a Client Selector 850 based upon the criteria of step 940. The criteria of step 940 indicates that the client is requesting an operation to a different page in the same bank of memory, as compared to the previous winner. This request results in the longest time penalty. Therefore, it is not as efficient to issue one of these requests over one of the previous requests which incur a lesser time penalty.

The Urgency Controller 816 will determine whether or not any client is in urgent need of data. This can be done by the client indicating that it is in urgent need of data, but if such a method is not easily available, a client can be deemed in urgent need of data if a timer started upon reception of a valid request from the Valid Request Portion 812 has timed-out or reached a specific value. If an urgent request is received, it has been too long since the client's request was received, and it needs to be service. When this occurs, the Urgency Controller 816 will provide an active signal or indicator to the Urgent Client Selector 820 of the Optimizer 730.

In the event multiple clients are requesting service from the same Client Selector or Urgency controller, the respective client selector will select one of the clients. One scheme for selecting among a plurality of clients requesting control at the same priority level is to use a round-robin technique. This allows the each controller to have the same priority. Another ordering criteria for selecting a client, when multiple requests at the same priority are received, is to have a fixed ordering whereby a first client will always be serviced prior to a second client's request, which is serviced prior to the third client's request, etc. One skilled in the art will recognize that various combinations of round-robin techniques, and strict ordering techniques can be used. In any event, the Urgent Client Selector 820 will issue a single request to the optimizer 860 for servicing.

Figure 9:
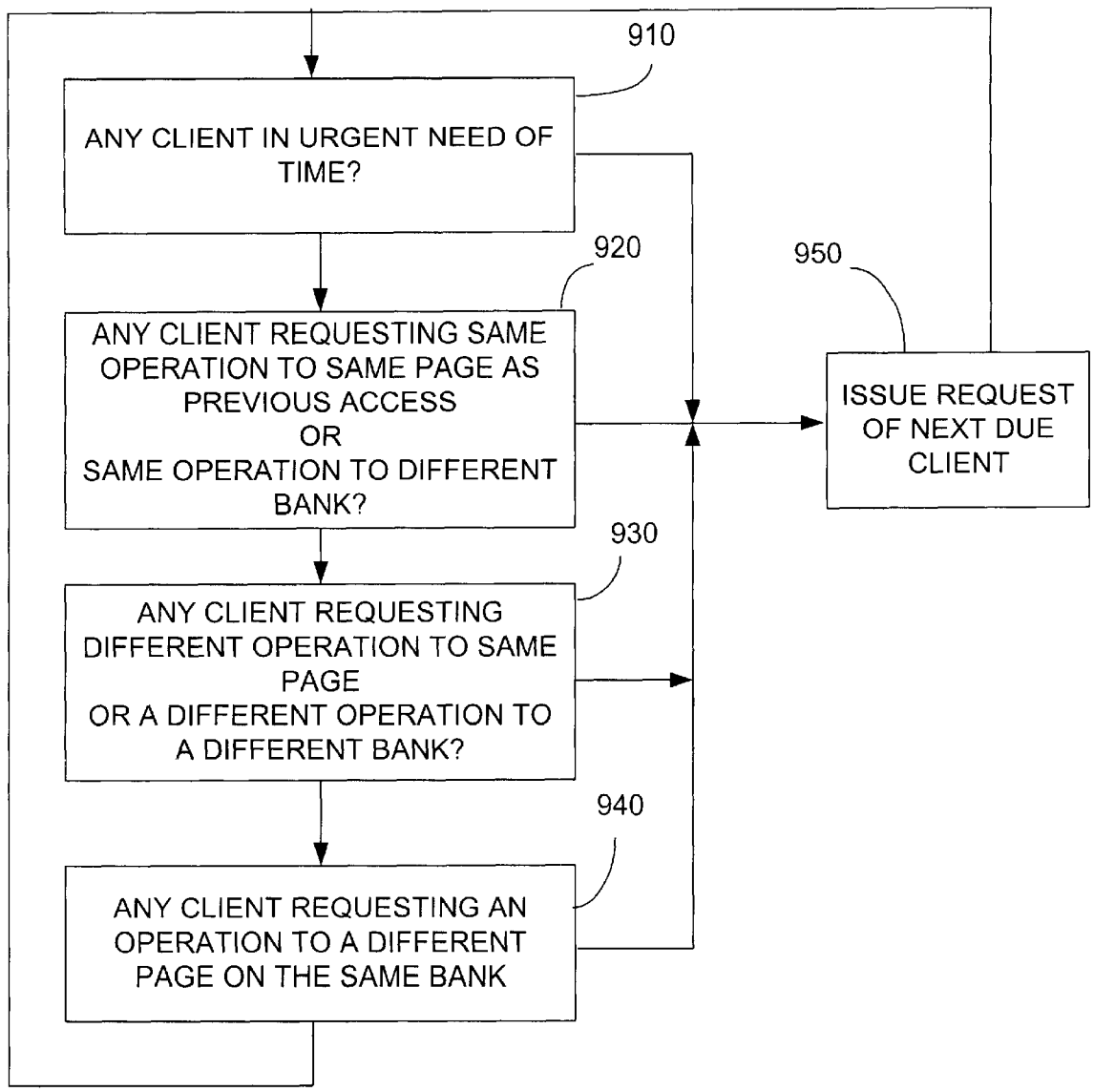
FIG. 9 illustrates, in flow diagram form, a method of utilizing the portion of the video controller of FIG. 8.

The method of FIG. 9 is implemented by the Output Controller Portion 860 of FIG. 8, in conjunction with the requests generated by the clients. The Optimizer Output Control 860 first determines at step 910 whether an urgent request has been supplied by Urgent Client Selector 820. If so, the Optimizer Output Controller 860 will issue this request prior to all others.

In the event the optimizer Output Controller Portion 860 does not receive an urgent request, flow proceeds to step 920, where a determination is made whether or not a request has been received from the Client Selector 830, which is a request having the same operation to the same page as the previous winner; or a request for the same operation to a different bank. If one of these requests is received, it is issued at step 950.

In the event the optimizer Output Control 860 does not receive a request from the Client Selector 830, flow proceeds to step 930, where a determination is made whether or not a request has been received from the Client Selector 840. Such a request having a different operation to the same page as the previous winner; or a request for a different operation to a different bank. If so, this request is issued at step 950.

In the event the Optimizer Output Controller Portion 860 does not receive a request from the Client Selector 840, flow proceeds to step 940, where a determination is made whether or not a request has been received from the Client Selector 850. Such a request having a different operation to the same page as the previous winner; or a request for a different operation to a different bank. If so, this request is issued at step 950.

The arbiting scheme of FIG. 9, tends to favor a request from whatever client provided the current winning request. This may result in the Urgency Controller issuing urgent requests out more frequently than necessary. Therefore, an alternative scheme can be desirable. One alternative scheme would limit the number of requests that a specific client will issue to the Optimizer 730, based upon how many times it has been a winner. For example, an additional efficiency criteria portion (Not illustrated) could be added to the optimizer 730. This efficiency criteria portion would receive requests from clients that have been serviced too frequently.

For example, a client that has been the winner sequentially for a predetermined number of times, such as three times will have its request sent to the efficiency criteria portion at a lower priority. Another embodiment will have a client that has been a winner for a given number of previous accesses will have its request sent to the efficiency criteria portion at a lower priority. For example, a client that has been a winner 3 of the last five accesses will be de-prioritized to allow other clients to receive data. This will allow a more even distribution of access time, without giving up efficiency.

Figure 10:
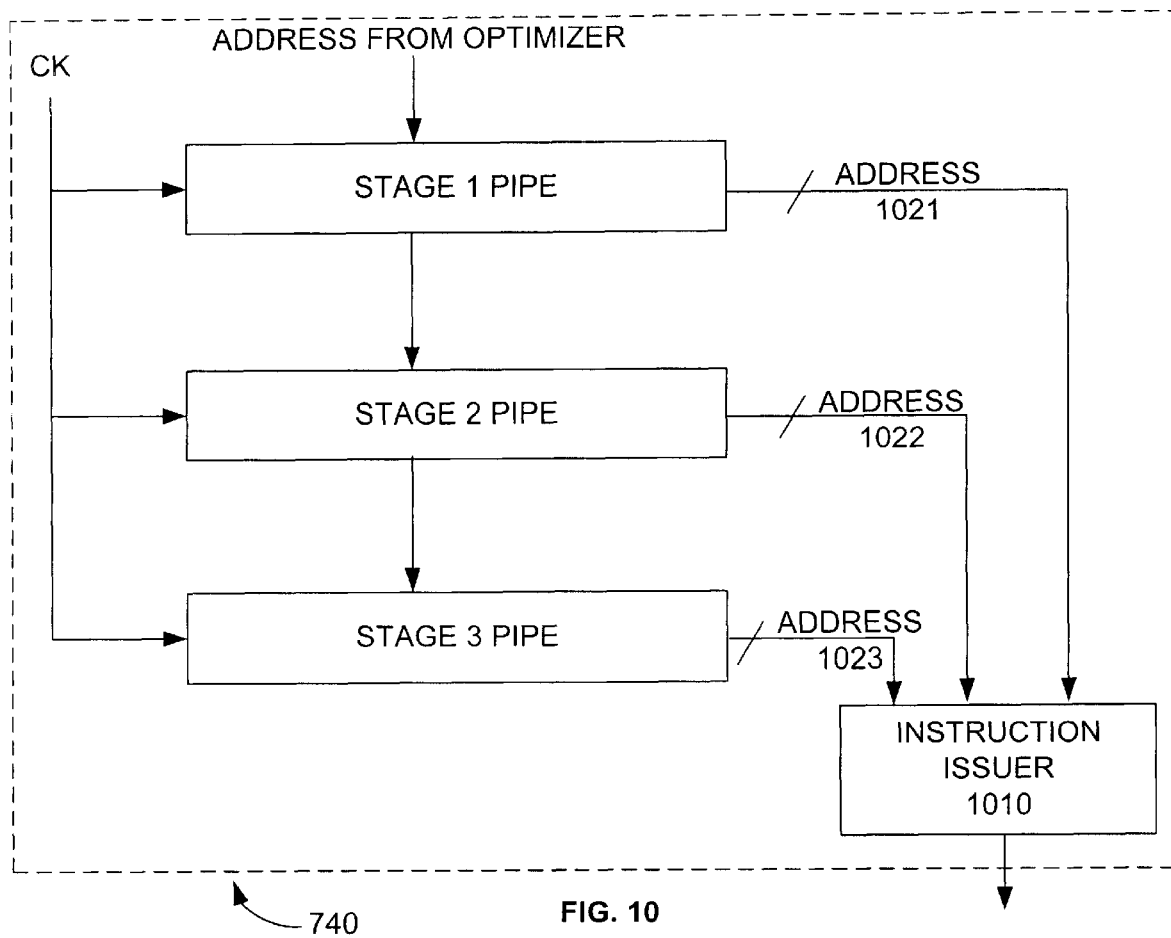
FIG. 10 illustrates, in block diagram form, a memory pipeline in accordance with the present invention.

FIG. 10 illustrates a portion of the memory pipeline 740 of FIG. 7. The memory pipeline 740 includes a Stage 1 pipe, Stage 2 pipe, Stage 3 pipe, and an instruction issuer 1010. The Stage 1 pipe receives address requests from the optimizer 730. The Stage 2 pipe is connected to the Stage 1 pipe to receive at least a portion of the address from Stage 1. The Stage 3 pipe is connected to the Stage 2 pipe to receive at least a portion of the address from Stage 2. The Stage 1 pipe, Stage 2 pipe, and Stage 3 pipe each have an address output connected to the instruction issuer 1010. In addition, each of the pipe stages 1 through 3 receives a clock signal.

Figure 11:
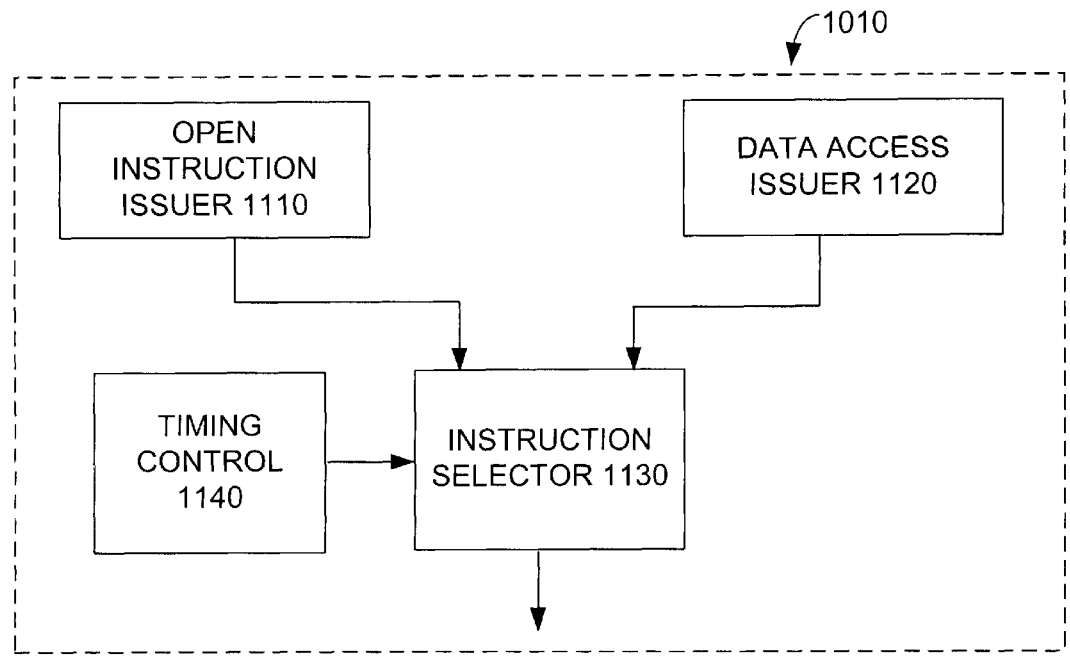
FIG. 11 illustrates, in block diagram form, a detailed view of an instruction issuer of FIG. 10.
Figure 12:
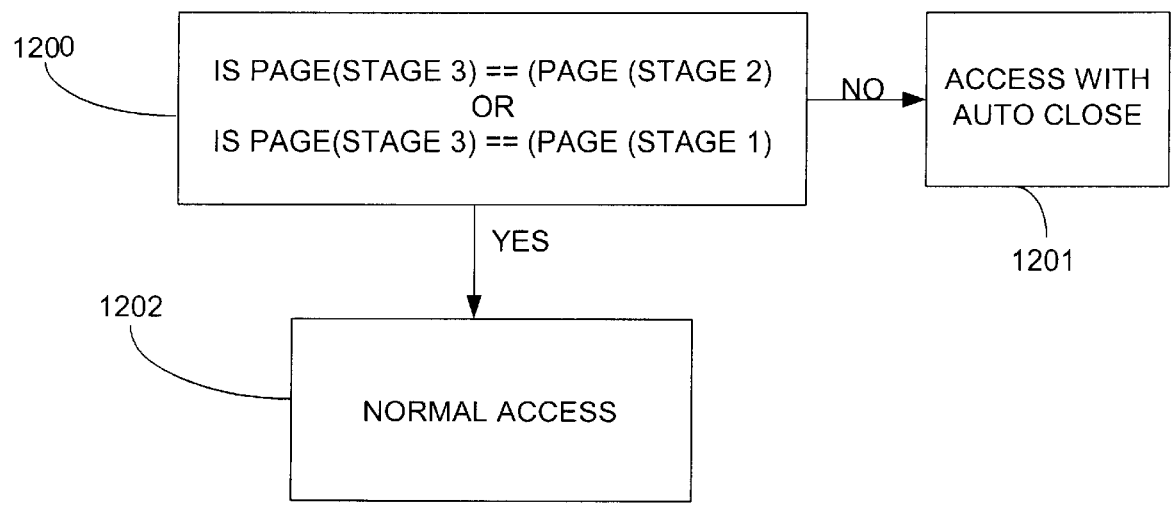
FIG. 12 illustrates a flow diagram for implementing an auto-close operation.

The operation of the instruction issuer 1010 is best understood with reference to FIGS. 11 through 14. FIG. 11 illustrates the instruction issuer 1010 in greater detail. The Instruction Issuer 1010 further comprises an open instruction issuer 1110, a Data Access issuer 1120, both coupled to the instruction selector 1130, and a timing control 1140 also connected to the instruction selector 1130.

The Data Access Issuer 1120 dynamically determines when a memory access instruction with an auto-close option is to be issued. The method of FIG. 12 corresponds to this function. At step 1200 of FIG. 12, a determination is made whether or not the memory page being accessed by the Stage 3 pipe is equal to the page being accessed by the Stage 2 pipe, or if the page being accessed by the Stage 3 pipe is equal to the page being accessed by the Stage 1 pipe. If either of these conditions is true, flow proceeds to step 1201. At step 1201, the data access issuer 1120 signals the instruction issuer 1010 of FIG. 10 to dynamically to issue a memory access instruction (request) with an automatic close option. A memory access instruction with an automatic close option closes the page of memory currently being accessed once the access has been completed. Note that the access can be either a write access operation or a read access operation. In the event that the criteria of step 1200 are not met, the flow proceeds to step 1202, where a normal access operation is requested. During a normal read or write access operation, the memory page is left open following the current access request.

Figure 13:
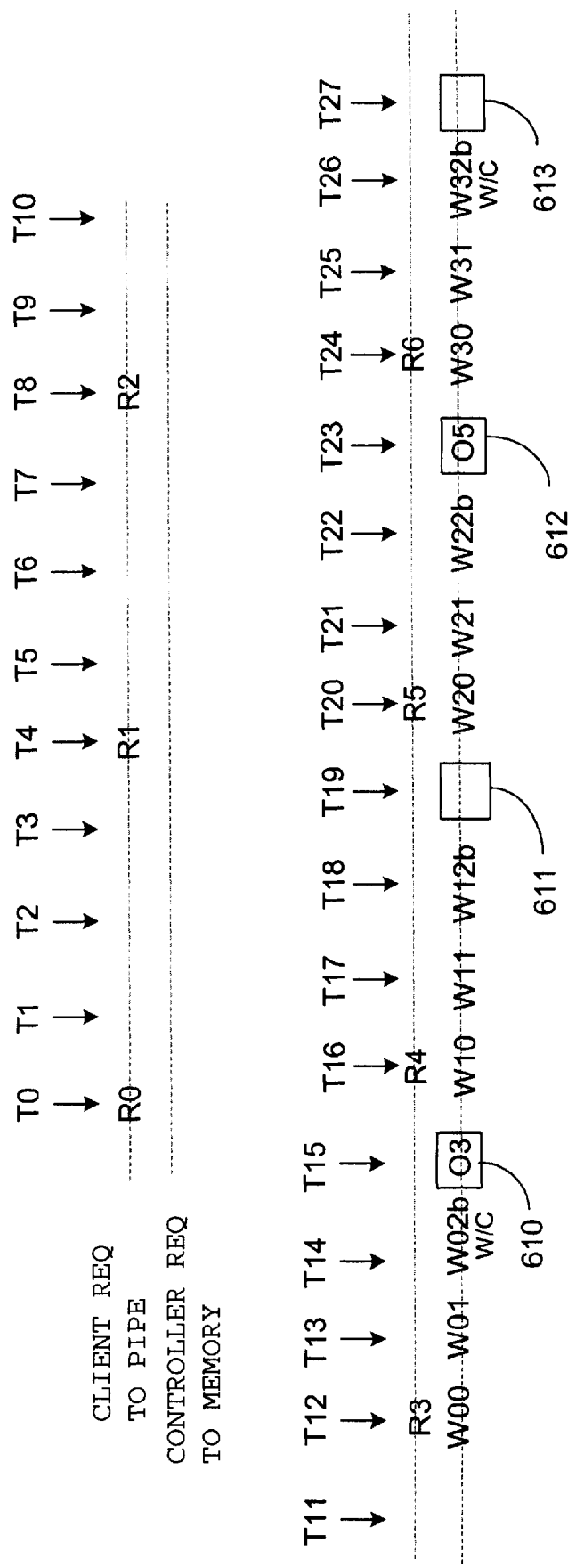
FIG. 13 illustrates specific time slots associated with requesting data in accordance with the present invention.

FIG. 13 illustrates a timing diagram illustrating the application of the read instruction issuer 1120. Specifically, referring to FIG. 13, which corresponds to the timing diagram of FIG. 6, a first client request is issued at time T0, a second client request is issued at time T4, and a third request is issued at time T8. At time T12, the Stage 3 pipe is ready to issue a command. During the R3 request time (T12–T15), the data access Issuer 1120 determines whether an auto-close request should be issued. If it is determined that an auto-close instruction, or request, should be issued by the auto close instruction will be issued by the instruction selector 1130 at time T14. As a result, the page being accessed can be closed in a time-efficient manner.

At time T18 of FIG. 3, a normal data access is illustrated. A normal access indicates that the page being accessed by the request R1 is going to be used again either by request R2 or by the request R3. Therefore, a normal access which leaves the page open is issued. Likewise, at time T22, a normal request is issued. However, at time T26 the write request was with an auto-close indicating that neither the R5 request nor the R6 request access the same page of memory as being accessed at time T26. Therefore, it is more time efficient to close the memory with the auto-close command at time T26.

Figure 14:
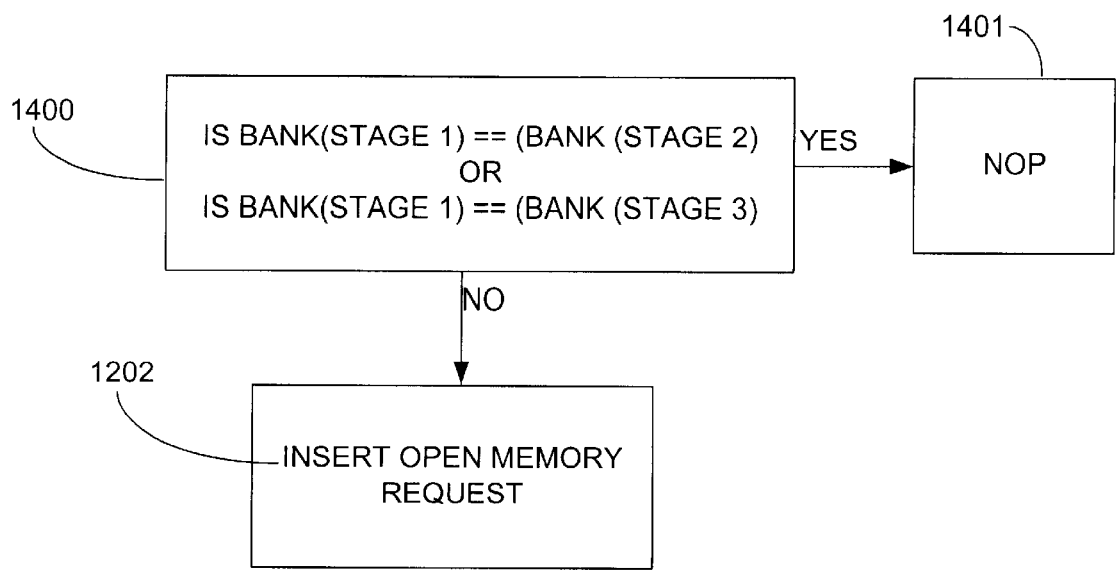
FIG. 14 illustrates a flow diagram for implementing open memory bank instructions.

The open instruction issuer 1110, of FIG. 11, is used to determine when the instruction issuer 1010 is to open a new bank of memory. The criteria used to determine when to open a bank is illustrated in the method of FIG. 14. At step 1400, a determination is made whether or not the bank being accessed by the Stage 1 pipe is equal to the bank being accessed by the Stage 2 pipe; or if the bank being accessed by the Stage 1 bank is equal to the Stage being accessed by the Stage 3 bank. If either of these conditions is true, it is an indication that the page will be used again and the flow proceeds to step 1401 where in effect a no-op is performed. A no-op is performed because the bank to be needed by the request in Stage 1 is already open and there is no need to insert an open command. In general, an actual No-op instruction is not inserted in to the request stream, instead no instruction is issued. However, if neither of the of step 1400 criteria is met, it is an indication that the Stage 1 Pipe will require access to a bank that is not currently open. As a result, the instruction issuer 1110 will cause the selector 113 to insert an open bank instruction. Instructions such as the open bank instruction are considered overhead instructions, in that they do not actually access data.

This is best illustrated with reference to FIG. 13. At time T15 of FIG. 13, which corresponds to the time diagram of FIG. 6, an open bank request (O3) is issued at time T15. The open bank request (O3) corresponds to the request R3. In other words, a determination has been made that the bank to be accessed by request R3 is not currently open. This determination occurs when neither the bank of request R2, nor the bank of request R1, which are currently open, are the same as the bank of R3. Therefore, at time T15 an open bank request for the bank associated with request R3 is inserted.

The open bank request is guaranteed to be issued because of the non-linear memory access structure of the data block as previously discussed. If the block being requested by the most recent request is currently open, no open bank command needs to be inserted. Thus, at times T19 and T27 where it is illustrated that no open bank request has been issued, the bank needed by the current client request is already open. However, at time T23, an open bank request has been issued in order to service the request R5. This indicates, the bank being addressed by request R5 is not open. Therefore, neither request R4 nor request R3 are accessing the same bank as needed by request R5. By requesting the bank being open at time T15, it assured that the page will be open at time T24, when the actual memory accesses for the data associated with request R3 is accessed.

FIG. 11 also includes a control block 1140 connected to the selector 1130. This control block 1140 provides timing and other signals necessary to insert the requests in on the request bus as indicated.

The present disclosure has illustrated an improvement over the prior art by identifying a data block storage method to allow for efficient vertical and horizontal block data accesses. The improvement over the prior art is that the accesses are allowed without penalizing the instruction bandwidth to a memory. In other words, a burst access is guaranteed to occur with each vertical column access, or horizontal row access. Thereby allowing for freed up bandwidth. In addition, an advantage over the prior art has been realized through the use of an optimizer allowing requests with the smallest time penalties to be issued before those requests having greater time penalties. In addition, the urgency feature of the arbiter (optimizer 730) allows for clients needing urgent updates to be serviced even when a penalty occurs. Yet another advantage of the present disclosure is the dynamic issuing of instructions, or data access requests to memory. In accordance with this aspect of the invention, the type of access request used to access memory can be dynamically changed from a normal request to a request with an auto-close feature dynamically, just prior to the issuing of the request to the memory. In addition, banks of memory needed to be used in the open by dynamically issuing an instruction prior to open the memory bank prior to the actual request needing to be serviced. Thereby optimizing the requests of minimizing the amount of time overhead associated with accessing memory.

The various components present in the present application, including the controllers, and issuers, may be implemented using processing modules, or devices, such as a data processor, or a plurality of processing devices. Such a data processors may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed above.

When data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry comprising of a state machine and/or logic circuitry, or it may be unnecessary because the function is performed using combinational logic.

While the specific invention has been illustrated with specific embodiments, one of ordinary skill in the art will recognize that many alternatives to the present invention can be implemented without deviating from the intent of the present invention. For example, the number of stages of the pipe presented herein may vary, in addition, the actual partitioning of the elements may be different than that indicated. For example, the pixel cache 760 of FIG. 7 may actually be contained within the memory controller portion 520. In addition, the accesses to memory discussed herein may also be contingent upon the data being located with in a cache, such as of the pixel cache 760 of FIG. 7. As yet another example, the efficiency Controller 818 of FIG. 8 could transmit a message to the controller 730 indicating priority of a request, as opposed to having separate nodes connected to each of the client selectors 830, 840, and 850. In addition, other commands besides auto-close commands may be chosen. For example, an auto-precharge command could be issued. Also, the arrangement of data and order of accesses described previously has been optimized for a three clock penalty to open and close a page. One can see that if the time penalty a different number of clocks, such as two clocks, that the order of memory accesses may be arranged to optimized for the different clock penalty.

What is claimed is:
1. A method of arbitrating data accesses among a plurality of clients in a video system, the method comprising the steps of:
   receiving from a first client a first data access request for a first memory location;
   determining a first efficiency indicator for the first data access request based on a previous access request;
   receiving from a second client a second data access request for a second memory location;
   determining a second efficiency indicator for the second data access request based on the previous access request;
   providing the first and second efficiency indicators to an optimizer; and
   issuing one of the first and second data access requests based upon which of the first and second efficiency indicators has a higher rank.

2. The method of claim 1, wherein each of the first and second efficiency indicators indicates:
   a first rank when its respective first and second data access request is to the same page and a same access operation is being performed as compared to the previous access request; and
   a second rank when its respective first and second data access request is to the same page and a different access operation is being performed as compared to the previous access request, wherein the first rank has a higher rank than the second rank.

3. The method of claim 2, wherein the first rank comprises:
   a first sub-rank when the same page has been accessed more than a predetermined number of time sequentially one of the first and second clients; and
   a second sub-rank when the same page has been accessed less than a predetermined number of time sequentially by one of the first and second clients, wherein the second sub-rank has a greater rank than the first sub-rank.

4. The method of claim 2, wherein the efficiency indicator indicates:
   a third rank when its respective first and second data access request is to a different page and a same bank as compared to the previous access request, wherein the second rank has a higher rank than the third rank.

5. The method of claim 4, wherein the efficiency indicator indicates:
   a fourth rank when its respective first and second data access request is to a different bank and a same operation as compared to the previous access request, wherein the fourth rank has the same rank as the first rank.

6. The method of claim 5, wherein each of the first and second efficiency indicators includes:
   a fifth rank when its respective first and second data access request is to a different bank and a different operation as compared to the previous access request, wherein the fifth rank has the same rank as the second rank.

7. The method of claim 2, wherein each of the first and second efficiency indicators includes:
   a third rank when its respective first and second data access request has not been serviced for a predetermined amount of time, wherein the third rank has a higher rank than the first rank.

8. The method of claim 2, wherein when the first and second efficiency indicator have the same rank, the first and second client are serviced in round robin order.

9. The method of claim 2, wherein when the first and second efficiency indicator have the same rank, the first and second client are serviced in a predetermined order.

10. A video system for arbitrating data accesses, the system comprising:
- a first video client having a data request portion having a first priority output node, a second priority output node, and a third priority output node;
- a second video client having a data request portion having a first priority output node, a second priority output node, and a third priority output node; and
- a arbitrator comprising:
  - a first priority selector having a first input coupled to the first priority output node of the first video client, and a second input coupled to the first priority output node of the second video client, and having an output;
  - a second priority selector having a first input coupled to the second priority output node of the first video client, and a second input coupled to the second priority output node of the second video client, and having an output;
  - a third priority selector having a first input coupled to the third priority output node of the first video client, and a second input coupled to the third priority output node of the second video client, and having an output; and
  - an arbitrator output control having a first input coupled to the output of the first priority selector, a second input coupled to the output of the second priority selector, a third input coupled to the output of the third priority selector, and an output.

11. The video system of claim 10, wherein the output of the arbitrator output control is coupled to a memory.

12. The video system of claim 10, wherein the output of the arbitrator output control is coupled to a third input of the first video client, and a third input of the second video client.

13. The video system of claim 10 further comprising a data bus coupled to the memory, the first video client, and the second video client.

14. The video system of claim 13, where in the data bus includes a 128-bit read data bus, and a 128-bit write data bus.

15. A video system for arbitrating access to a memory, the system comprising:
- a first client coupled to receive a previous access request and to provide a first data access request for a first memory location, the first client having an efficiency controller to provide a first output to provide a first efficiency indicator of the first data access request based on the previous access request; and
- a second client coupled to receive the previous access request and to provide a second data access request for a second memory location, the second client having an efficiency controller to provide a first output to indicate a first efficiency indicator of the second data access request based on the previous access request.

16. The video system of claim 15, further comprising:
- a first client selector having a first input coupled to the first output of the first client, and a second input coupled to the first output of the second client, and an output.

17. The video system of claim 15 wherein:
- the efficiency controller of the first client further comprises a second output to indicate a second efficiency indicator of the first data access request based on the previous access request;
- the efficiency controller of the second client further comprises a second output to indicate a second efficiency indicator of the second data access request based on the previous access request; and
- the video system further comprising a second client selector having a first input coupled to the second output of the first client, and a second input coupled to the second output of the second client, and an output.

18. The video system of claim 15, further comprising:
- an efficiency selector having a first input coupled to receive the output of the first client selector, and a second input coupled to receive the output of the second client selector, and having an output.

19. The video system of claim 18 further comprising a memory having an input coupled to the output of the efficiency selector.

* * * * *